March 29, 1960

R. A. LABINE 2,930,173

MACHINE FOR WRAPPING AN ASSEMBLY OF CYLINDRICAL ARTICLES

Filed June 14, 1957

INVENTOR
ROLAND A. LABINE

BY Chapin + Neal
ATTORNEYS

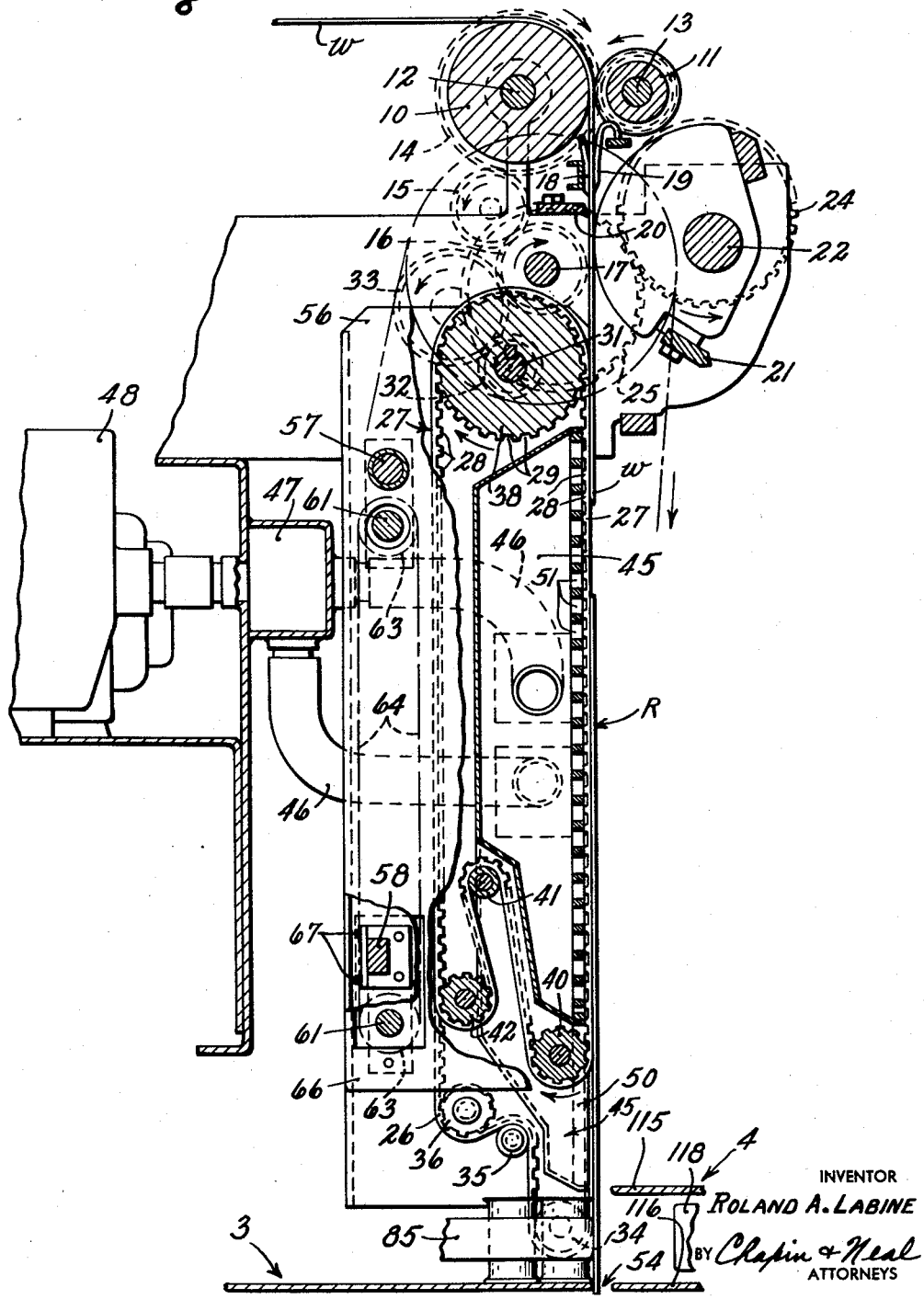

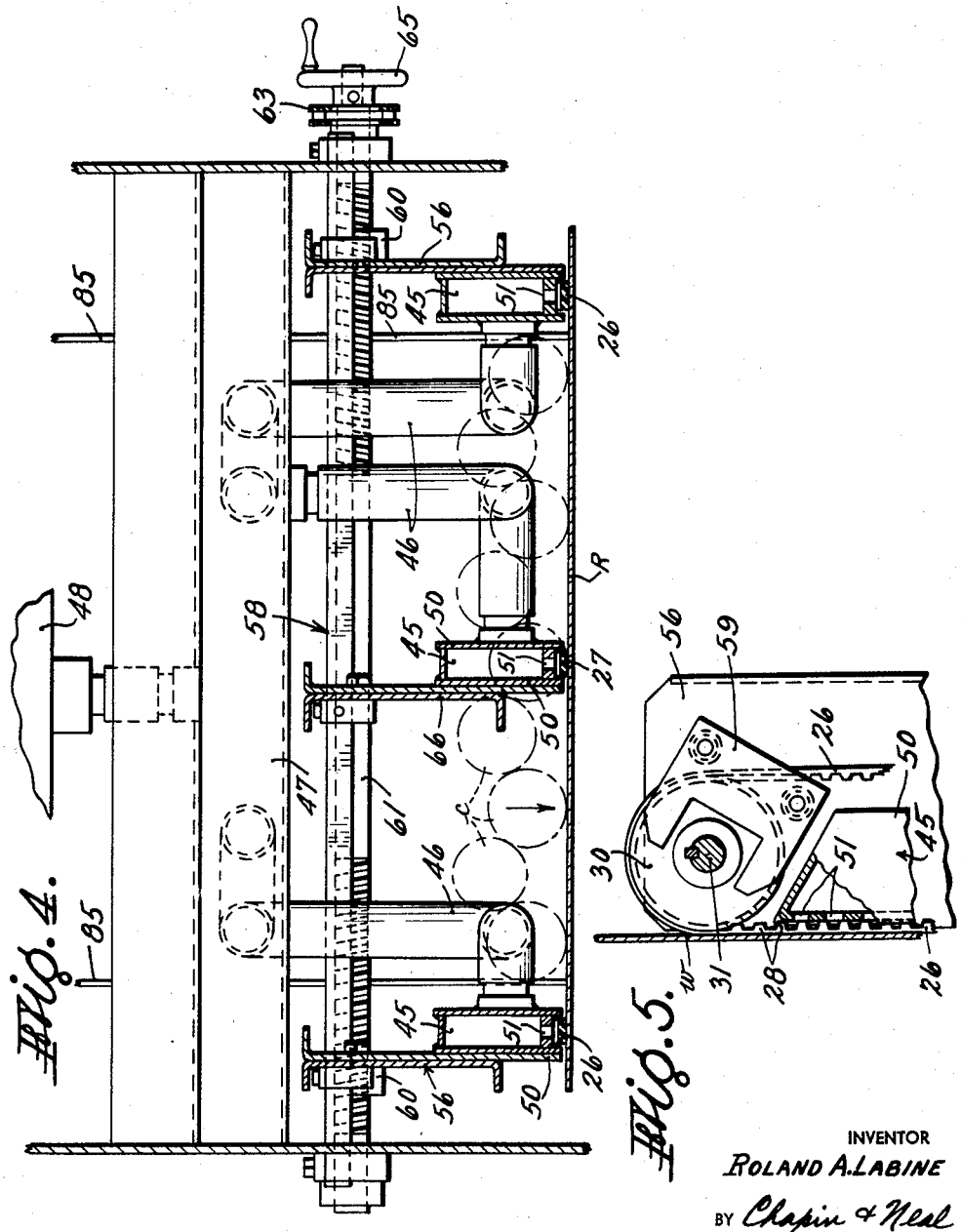

March 29, 1960

R. A. LABINE 2,930,173

MACHINE FOR WRAPPING AN ASSEMBLY OF
CYLINDRICAL ARTICLES

Filed June 14, 1957

INVENTOR
ROLAND A. LABINE
BY Chapin + Neal
ATTORNEYS

Fig. 7.

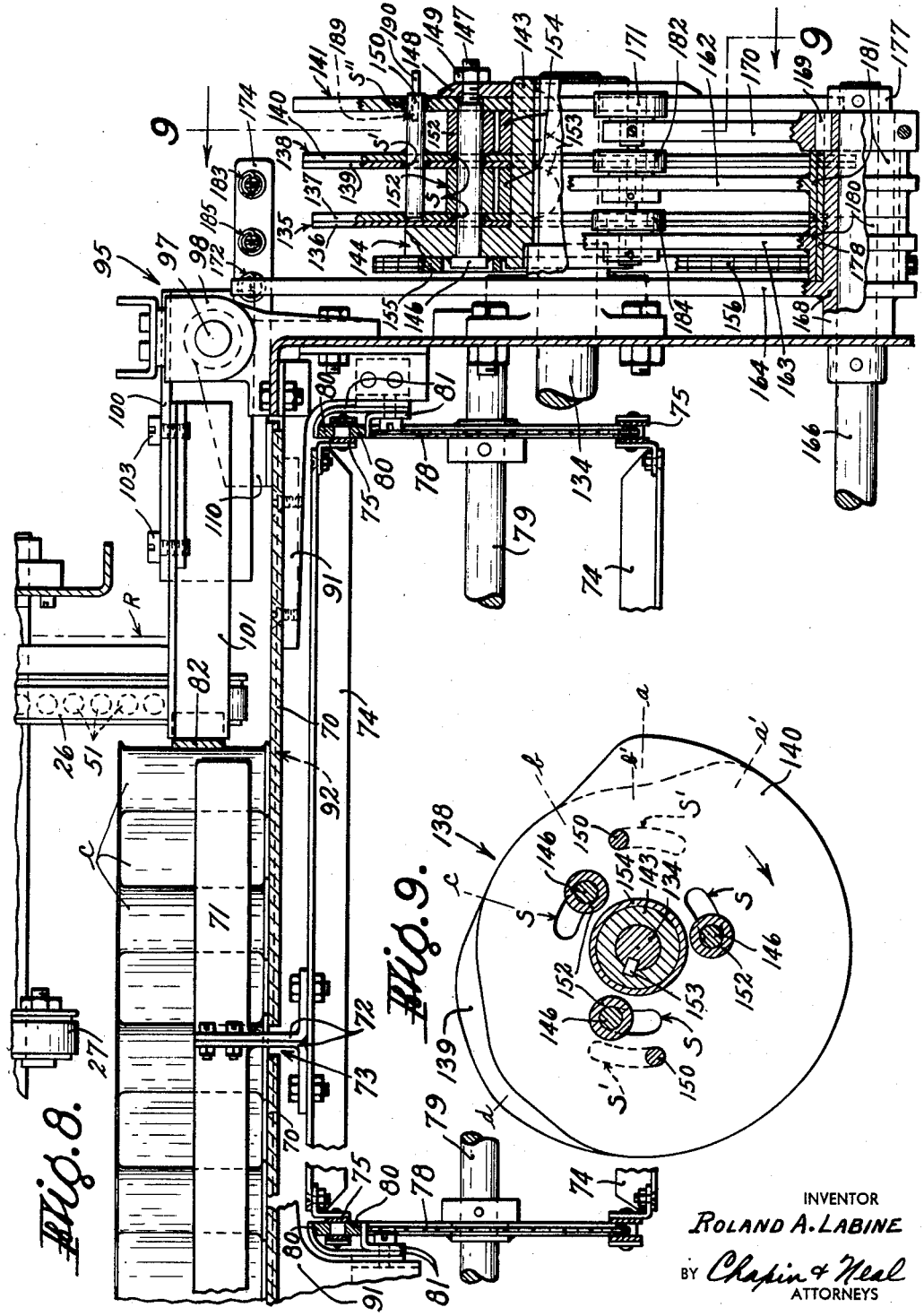

March 29, 1960
R. A. LABINE
2,930,173
MACHINE FOR WRAPPING AN ASSEMBLY OF CYLINDRICAL ARTICLES
Filed June 14, 1957
9 Sheets—Sheet 8
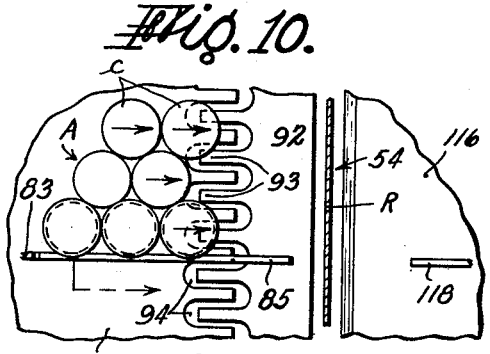
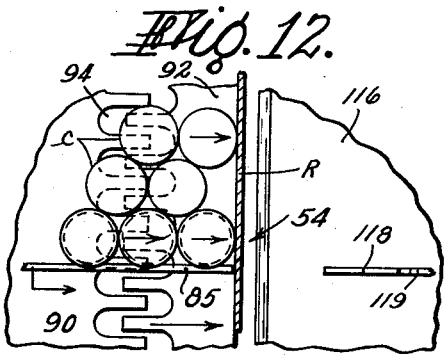
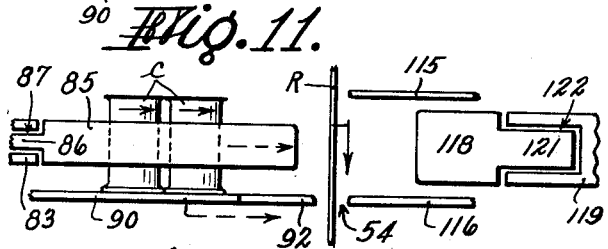
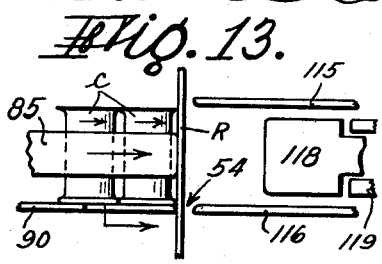
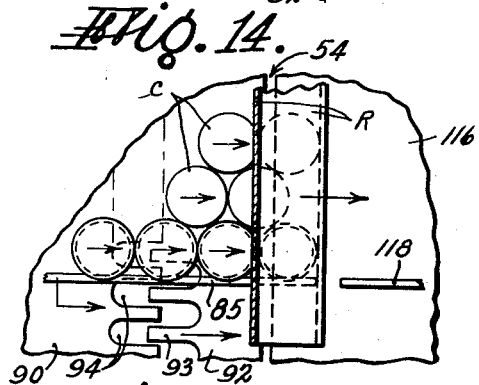
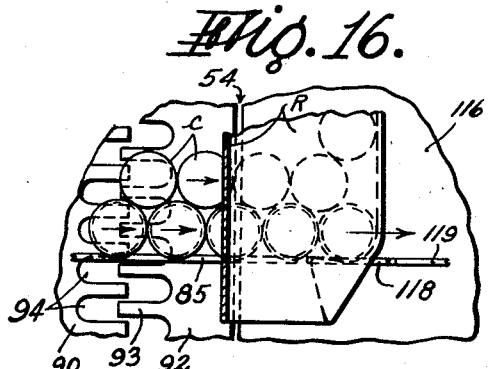
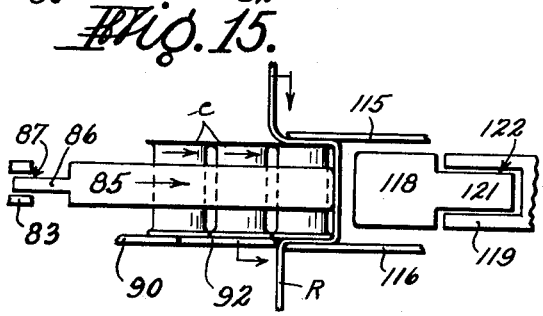
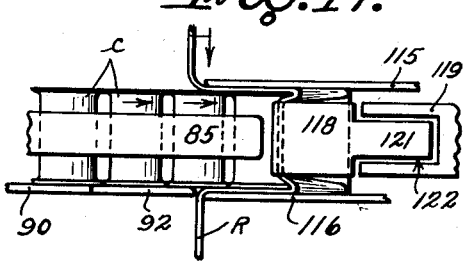
INVENTOR
ROLAND A. LABINE
BY Chapin & Neal
ATTORNEYS

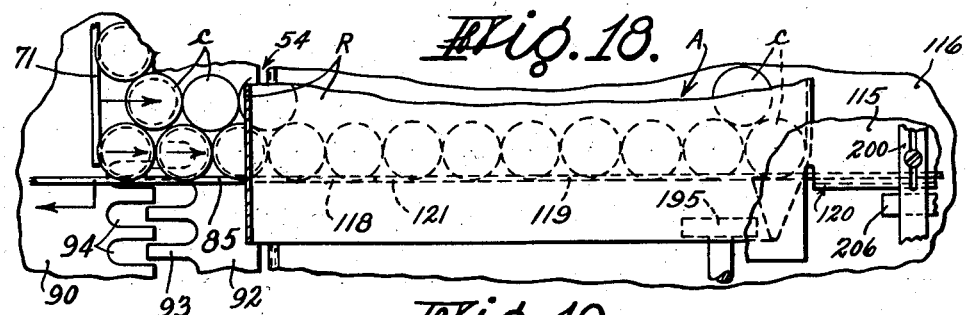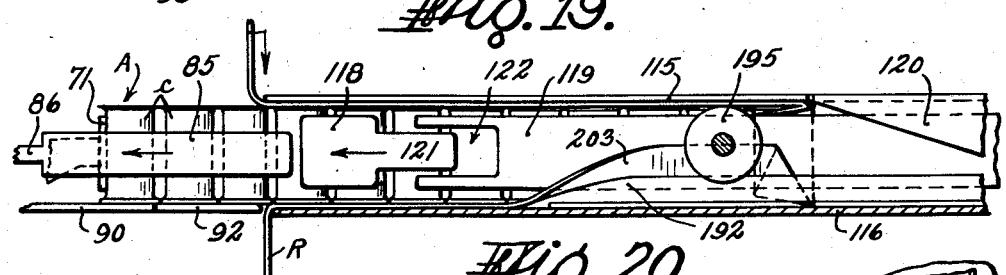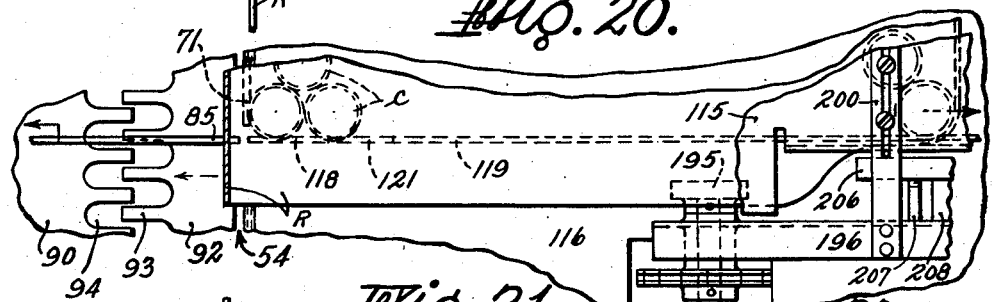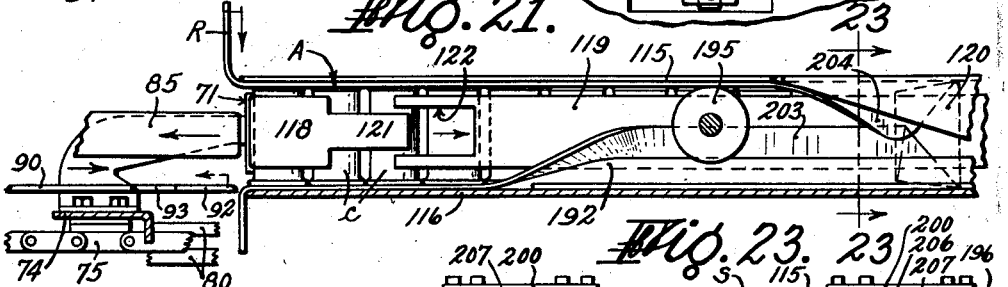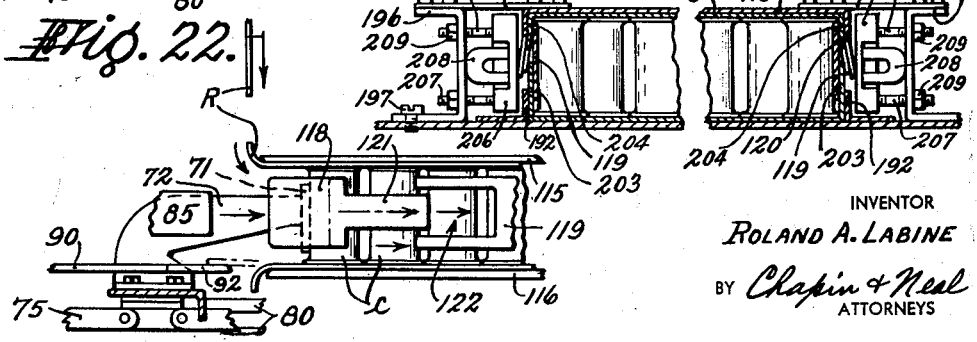

United States Patent Office 2,930,173
Patented Mar. 29, 1960

2,930,173

MACHINE FOR WRAPPING AN ASSEMBLY OF CYLINDRICAL ARTICLES

Roland A. Labine, Somers, Conn., assignor to Package Machinery Company, East Longmeadow, Mass., a corporation of Massachusetts Application June 14, 1957, Serial No. 665,769

16 Claims. (Cl. 53—230)

This invention relates to machines for wrapping or bundling an assembly of cylindrical articles, more particularly to machines for wrapping a generally rectangular assembly of cylindrical articles arranged in standing position in interengaging rows.

There are certain advantages in the shipping of empty cans in relatively large wrapped packages, both in the handling of the cans in loading them into and removing them from freight cars or trucks, and in handling them after they are received at the cannery where they are to be filled. To realize these benefits to the fullest the cans must be wrapped in a close generally rectangular arrangement and the wrapping must be sufficiently tight to maintain the shape of the package during handling and shipment and to permit effective machine opening of the package at the cannery, as by a device such as is shown and claimed in Patent No. 2,732,619, issued January 31, 1956.

In wrapping an assembly of cylindrical articles such as cans, if the assembly is to be sufficiently stable to sustain shipping and handling hazards and at the same time be so wrapped that they can be discharged directly into the feed line of the can filling equipment from the opened package, the assembly must be substantially rectangular in form and comprise a single layer of cans standing on end, with the rows interengaging each other, that is there will be one less can in alternate rows, the cans of the short rows engaging between the cans in the adjacent long rows.

It has been found that the best form of package for the purposes above described is of the type provided by advancing the assembly endwise against a wrapper sheet positioned transversely of the path of advance of the assembly and into a wrapping channel to lay the end portions of the wrapper over and along the upper and lower faces of the assembly, the wrapper being of a width to extend outwardly from the leading end face and sides of the assembly. The wrapping channel is provided with side tuckers and folders, the tuckers folding the side extension of the wrapper at the leading end against the sides of the assembly and the folders folding the upper and lower side extensions in overlapping relation along the sides of the assembly. The trailing end and side extensions are subsequently folded by suitable means against the trailing end of the package to complete the wrapping. The overlapped portions of the wrapper are held in place by a suitable adhesive.

This general type of wrapped package is old and well known in the wrapping of relatively small solid articles or boxed products. However, its use in wrapping or bundling to form relatively large packages of individual cylindrical articles such as cans has presented substantial problems. For the handling and shipping purposes above described the packages must be of a width and length adapted to palletizing for lift truck handling—the height, of course, is that of the can which is to be wrapped or bundled. Experience has shown that a package length approximating 28 inches and a width of 20 inches is preferable. Depending on the size of the cans, packages having length and width measurements of 26¼" x 17⅝", 27" x 16¾", 25½" x 19¾", and 22¾" x 26" have been found satisfactory. A package size approximating 28" x 20", as a general maximum, is the criterion rather than the number of cans in the package.

Among the problems involved in forming packages of the character and for the purposes above described are those inherent in handling wrappers of relatively heavy stiff paper of adequate size, the maintenance of a tight assembly of the cans during wrapping and the close and accurate initial folding of the wrapper as it is engaged by the assembly and the subsequent folding of the leading end side tucks and side folds.

It is the principal object of the invention to provide wrapper feeding, assembly guiding and wrapper folding instrumentalities which in combination will meet the above difficulties and at the same time effect a rapid and economical enclosure of the assembly in a manner to secure the shipping, handling and package opening advantage previously mentioned.

Other and further objects will be made apparent in the disclosure of the accompanying drawings and in the following specification and claims.

In the accompanying drawings,

Fig. 3 is a sectional view substantially on line 3—3 of Fig. 2 and including the wrapper web feed rolls;

Fig. 4 is a sectional view substantially on line 4—4 of Fig. 2;

Fig. 5 is a sectional view substantially on line 5—5 of Fig. 2;

Fig. 6 is a fragmentary side elevational view showing the central portion of Fig. 1 on a larger scale;

Fig. 7 is a sectional view, on a smaller scale, of the structure shown in Fig. 6 taken substantially on line 7—7 of Fig. 1;

Fig. 8 is an end elevational view on a larger scale looking from the left of Fig. 6, parts being broken away and in section;

Fig. 9 is a detail sectional view, showing an adjustable cam arrangement, taken substantially on line 9—9 of Fig 8;

Figs. 10 to 22 are diagrammatic views showing successive assembly guiding and folding steps; and Fig. 23 is a sectional view of the folding channel taken on line 23—23 of Fig. 21.

Figure 1:
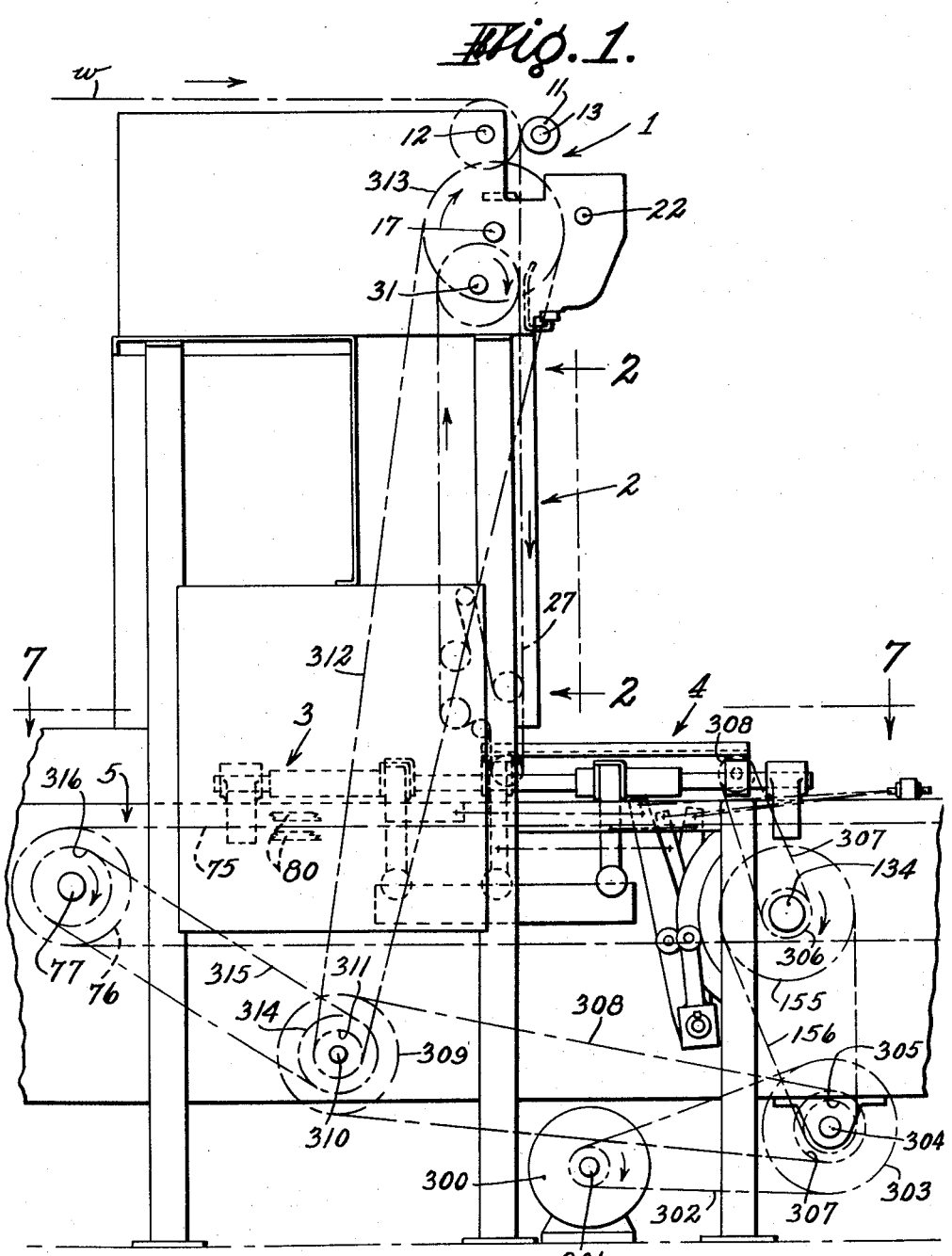
Fig. 1 is a fragmentary side elevational view of a machine embodying the invention.

Referring to Fig. 1 the machine is shown as comprising wrapper web advancing mechanism generally indicated at 1; means generally indicated at 2 for advancing wrapper sheets severed from the web; a supporting and guiding means generally indicated at 3 for supporting and guiding an assembly of cylindrical articles such as cans, a folding channel generally indicated at 4 and conveying means, generally indicated at 5 for advancing the can assembly over the support and, with the wrapper, into and through the wrapping channel.

Figure 2:
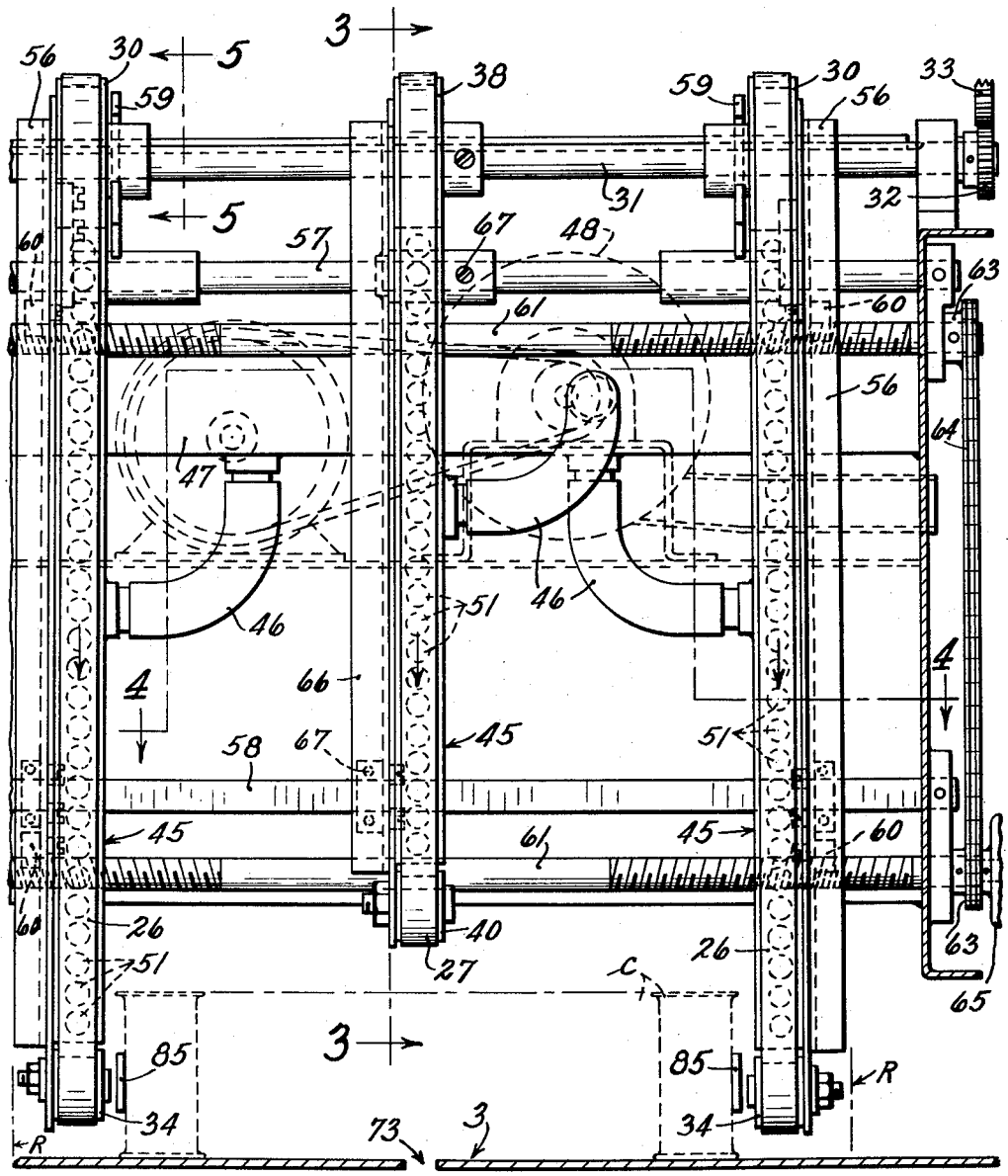
Fig. 2 is a front elevational detail view, looking in the direction indicated by arrows 2—2 in Fig.1, on a larger scale and showing the wrapper feed belts.

Referring to Figs. 2, 3 and 4, a web $w$ of wrapping material, such as kraft paper, is supplied from a suitable source, not shown, to feed-rolls 10 and 11 (Fig. 3) mounted on respective shafts 12 and 13. Roll 10 is constantly driven by means of a gear 14 fixed to shaft 12 and meshing with an intermediate gear 15 which meshes with a gear 16 fixed to a shaft 17, constantly driven as later described. From rolls 10 and 11 the web $w$ advances between a plate 18 and guide 19 and past a stationary knife 20. When a wrapper length of web has passed knife 20 the length is severed by the engagement of a rotating blade 21, carried by a shaft 22, with the stationary knife 20 to form a wrapper sheet R. Shaft 22 carries an eccentric gear 24 which meshes with an eccentric gear 25 fixed to drive shaft 17 by which the blade 21 is rotated, to supply the desired length of wrapper.

Prior to the cutting of the wrapper the leading end of the web has advanced over spaced belts 26 and an intermediate belt 27, Fig. 2—the belts 26 engage the web adjacent its edges while belt 27 engages the longitudinal center of the web. Belts 26—27 as shown are of the type having gear-like teeth 28 on their rear or inner faces which mesh with grooves 29 formed in the pulley over which they pass so that the belts are positively driven in unison without slippage. Belts 26 pass over respective pulleys 30 splined onto a shaft 31. Shaft 31 carries a gear 32 which meshes with an intermediate gear 33 driven by previously mentioned gear 16 fixed on drive shaft 17. From pulleys 30 the belts 26 pass downwardly and around idler pulleys 34, 35 and 36. Center belt 27 passes over a pulley 38 fixed to before-mentioned shaft 31 and passes downwardly and around idler pulleys 40, 41 and 42.

The belts 26 and 27 pass over respective suction boxes 45 connected by flexible pipes 46 to a manifold 47 connected to a vacuum pump indicated at 48. The faces of the suction boxes 45 are provided with side flanges 50, between which the belts run with a slight clearance (Fig. 4), and are provided with a succession of openings 51. The paper web, and the wrapper sheet after severance, are held to the belts by suction through openings 51, the channels provided between the teeth 28 on the inner side of the belts and the clearance between the edges of the belt and flanges 50.

As best shown in Figs. 2 and 3 the belts 26 and their suction boxes, which extend downwardly approximately to the surface of the can support 3 and the wrapping channel 4, diverge slightly outwardly from the center belt 27 thus tending to spread the wrapper sheet so that it feeds smoothly through the slot 54 between the can assembly supporting surface and the wrapping channel, later described.

The pulleys 30, 34, 35 and 36 and the suction boxes associated with the belts 26 are carried by respective vertical frame members 56 slidably mounted on a cross rod 57 and a cross bar 58. The pulleys 30 which are splined on drive shaft 31 are engaged on opposite sides by frames 56 and yokes 59 carried by frames 56 and are thus constrained to move with the frames 56 while maintaining their driven relation with shaft 31.

The frames 56 are provided with respective half-nuts 60 which respectively make a threaded engagement with the threaded end portions of shafts 61, the threads at opposite ends of the shafts 61 being reversely pitched as indicated in Fig. 2 so that rotation of the shafts 61 adjusts the belts 26, and their associated suction boxes toward or from each other to accommodate various widths of wrapper and to position them in proper relation to the edges of the wrapper sheets. The shafts 61 are provided with sprockets 63 connected by a sprocket chain 64 for simultaneous rotation of both shafts by a hand wheel 65 fixed to one of them. Belt 27 with its associated pulleys and suction box are mounted on a frame member 66 similar to frame members 56 but are fixed by suitable set screws or bolts 67 to the supporting cross members.

The belts 26 and 27 are driven at a somewhat greater speed than feed roll 10 so that, as shown in Fig. 3 the severed wrappers R advance beyond and become suitably spaced from the leading end of the wrapper w.

Figure 7:
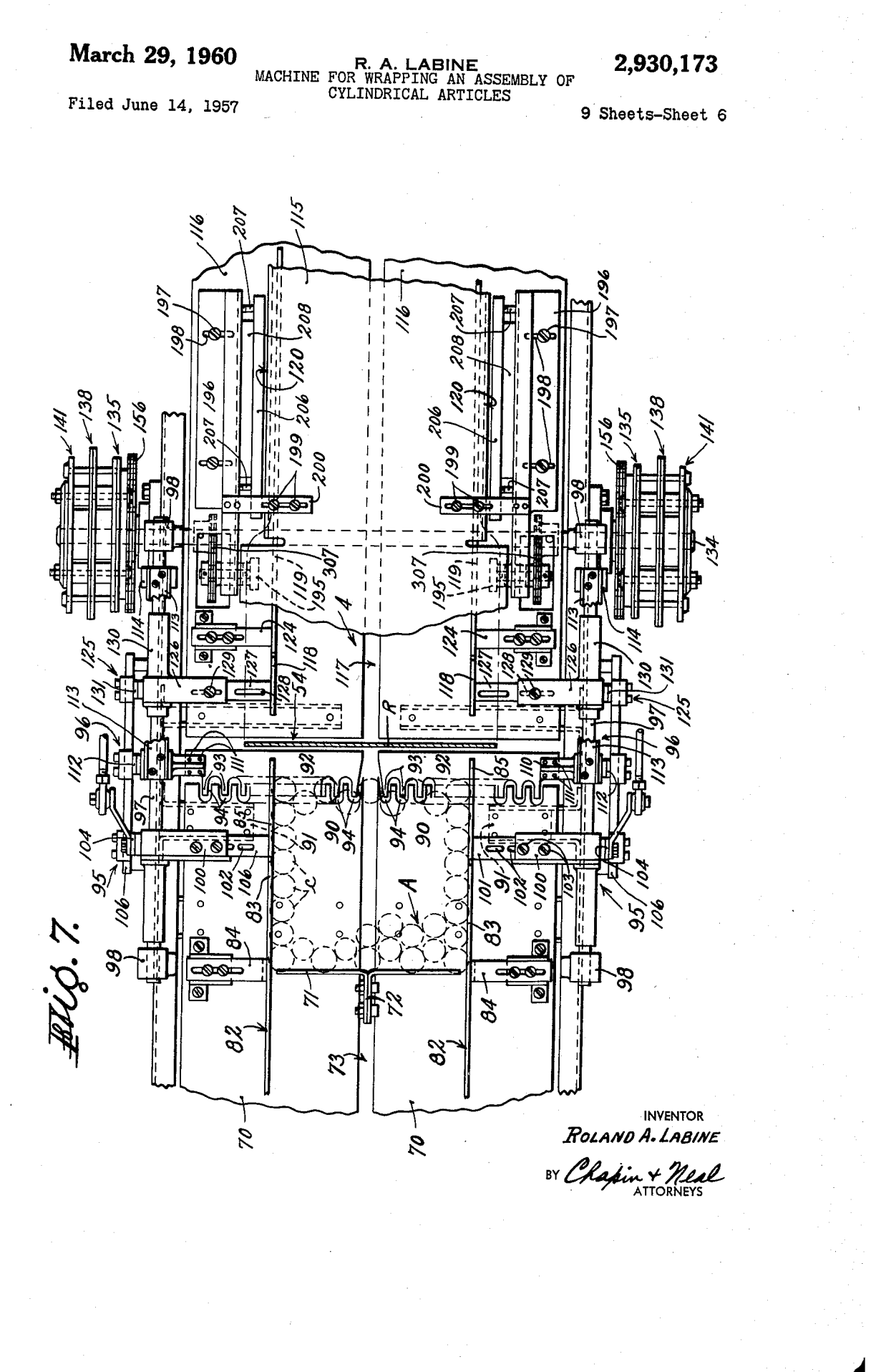

Referring to Figs. 1, 7 and 8 a rectangular assembly A of cans c in upright position is assembled on the can support which, as shown, comprises a split supporting table or surface 70 and is advanced thereover by a series of pushers 71. The pushers 71 are connected by goosenecks 72, which extend through a center slot 73 in split table 70, to cross members 74 connected at their ends to conveyor chains 75. Chains 75 pass around sprockets 76, Fig. 1, fixed to a shaft 77 at the entrance end of the machine, and driven as later described, and around similar sprockets 78, Fig. 8, carried by a shaft 79 positioned adjacent the discharge end of the folding channel. The upper runs of chains 75 are supported intermediate the sprockets 76 and 78 by guide rails 80, positioned above and below the chains and supported by brackets 81 from the machine frame, to maintain the pushers vertical.

The can assembly is formed on table 70 between side guides generally indicated at 82 (Fig. 7) which maintain the assembly in form as it is advanced over the table. The rear portions 83 of the side guides are held in fixed relation to the table as by adjustable brackets 84 but the forward portions 85 are extensible in the direction of the movement of the can assembly. As best shown in Figs. 11 and 15 the portions 85 are provided with extensions 86 which extend within recesses 87 in the adjacent ends of portions 83, the length of the extensions and depth of the recesses being sufficient so that as the portions 85 are advanced, as later described, the side guides maintain control of the can assembly, the lengthwise dimensions of extensions 86 and recesses 87 being greater than the extent of the advance of portions 85.

Similarly (Fig. 7) the split table 70 includes a fixed rear portion 90, secured to supports 91 (Fig. 8) extending from the side frames, and an extensible forward portion 92, the latter being formed with extensions 93 which extend within recesses 94 formed in the adjacent edge of portion 90 to maintain continuity of support throughout movement of the forward portion 92.

The forward movable side guide portions 85 and the forward movable table portions 92 are supported by respective carriages generally indicated at 95 and 96 riding on parallel bars 97 positioned on opposite sides of the machine. It will be understood that the guide bars and carriages on opposite sides of the machine are similarly constructed and a description of one set is believed adequate for both.

As best shown in Figs. 6 and 7, the bars 97 are rigidly supported in spaced vertical brackets 98 fixed to the machine frame. Carriages 95 each include a cantilever bracket 100. The adjacent side guide member 85 is provided with an arm 101, welded or otherwise suitably secured thereto, arm 101 being provided with slots 102 for adjustable connection to the bracket 100 by means of machine screws 103. To prevent rotation about the bar 97 carriages 95 are also each provided with a downwardly extending member 104 having its free end engaging one side of a horizontal guide bar 106, fixed in spaced relation to the machine frame, a plate 107 being secured as by screws 108 to member 104 to engage the opposite face of bar 106.

The carriages 96 each carry a cantilever bracket 110 the free end of which is connected as by screws 111 (Fig. 7) to the adjacent end of table portion 92, and are each provided with a downwardly extending member 112 similar in all respects to member 104, previously described, and similarly engaging bar 106 to prevent rotation of the carriage about bar 97.

To prevent possible tipping of the portions 92 as the can assembly passes thereover carriage 96 is connected by a channel member 113 to a bearing member 114 slidably mounted on bar 97 in spaced relation to the carriage.

The folding channel 4 positioned at the opposite side of slot 54 (through which the wrapper sheet is fed as previously described) from the table 70 comprises a top member 115, a split floor member 116, providing a central slot 117 to accommodate the pushers 71, side members which include reciprocating tucker members 118 extensible from fixed side members 119, and side folders 120—192, later described. It will be understood that the set of tuckers and side folders at opposite sides of the folding channel are similarly constructed and a description of one set is believed adequate for both. As best shown in Fig. 19 the tuckers 118 are each formed with an extension 121 which extends into a recess 122 formed in the adjacent end of member 119 so that as tuckers 118 are reciprocated longitudinally, as later described, the restraint imposed on the sides of the can assembly as it passes through the folding channel by the tuckers and side folders is maintained in all positions of the tuckers. The side members 119 are supported in adjustable position by any suitable means as by adjustable brackets 124 (Fig 7) similar to brackets 84.

The tuckers 118 are supported by respective carriages 125, Figs. 6 and 7, slidably mounted on the adjacent rods 97. Each carriage 125 carries a channeled cantilever bracket 126, the adjacent tucker 118 being provided with an arm 127, welded or otherwise secured thereto, which is adjustably connected to bracket 126 by slots 128 and screw 129. The bearings of the carriages 125 on the bars 97 are elongated as indicated at 130 to better resist any tipping thrust on the tuckers and each carriage is provided with a downwardly extending member 131 similar in all respects to member 104, previously described, and similarly engaging bar 106 to prevent rotation of the carriage about bar 97.

The several carriages 95, 96 and 125 are reciprocated by respective cams generally indicated at 138, 135 and 141, Figs. 6, 7, and 8, which are mounted on and driven by a common shaft 134, cams 135 and 138 having adjustable cam surfaces.

Similar cam assemblies are positioned on opposite sides of the machine at either end of the cam shaft 134 to operate the similar side guides and carriages and a description of one cam unit is believed adequate for both.

As best shown in Figs. 6, 8 and 9, cams 135, 138 and 141 are all mounted on a hub 143 which is splined or keyed on shaft 134 as indicated at 153 and is formed with a flange 144. Bolts 146 are welded to flange 144, in equally circumferentially spaced relation, and extend through all the cams. Bolts 146 are formed with shouldered and threaded portions 147 to receive a clamping plate 148, and nuts 149 by which the cams forming the assembly are clamped in adjusted position on the bolts for rotation with hub 143, which rotates in timed relation with the conveyor 5.

Cam 135 comprises two members 136 and 137 each of the same peripheral configuration, and cam 138 is similarly formed of two members 139 and 140 each of the same peripheral configuration. Cam 141 is formed of a single member.

The cams 135, 138 and 141 are held in spaced relation by spacers 152 on bolts 146 and spacers 154 on hub 143.

The bolts 146 pass through round openings in members 136 and 139 of cams 135 and 138, respectively, and in cam 141; and through arcuate slots S in members 137 and 140 of cams 135 and 138, respectively. Member 140 carries a pair of pins 150 welded thereto and extending inwardly of the cam assembly through a round opening in member 140 and arcuate slot S' in member 139 of cam 138 and into a round opening in member 137 of cam 135 and outwardly of cam 141 through a slot S". A drive sprocket 155 is welded to flange 144 and is driven by a sprocket chain 156, as later described, to rotate the cam assemblies in timed relation with the pusher conveyor. By the arrangement described the timing of carriages 95, 96 and 125, can be adjusted simultaneously to accommodate various lengths of can assemblies while maintaining the mechanisms controlled by the cams in proper timed relation with respect to the pushers 71. Such adjustment is effected by loosening binding nuts 149 a sufficient amount to allow cam member 140, carrying studs 150, to be turned by hand which will also move the cam member 137 of cam 135, in relation to their respective facsimile cams 139 and 136, and cam 141, which are held stationary in relation to the driving flange 144 by the bolts 146, and again tightening nuts 149, to maintain the adjusted timed relation between them. As will be understood the cam assemblies on opposite sides of the machine must be identically adjusted. The head of one of the pins 150 is provided (Fig. 6) with a mark or pointer 188 which may be brought into alignment with any of the various graduation marks 188' scribed on the outer face of cam 141 to indicate the desired cam adjustment. The manner in which this adjustment effects the desired result is later fully described.

As shown in Figs. 6 and 8, carriages 95, 96 and 125 are connected by respective links 158, 159 and 160, pivoted at one end to the downwardly extending members 104, 112, and 131 respectively, and at their other end, to respective operating levers 162, 163 and 164 which all pivot about the axis of a stationary shaft 166 supported from the side frame. Freely mounted on shaft 166 is a sleeve 168, to one end of which lever 164 is welded and to the other end of which is keyed, at 169, a lever 170 carrying a cam roll 171 which is held in contact with the periphery of cam 141 by a spring 172 having one end connected to the upper end of lever 164, the other end to bar 174 secured to the frame by bolts 175. A collar 177 secured to the outermost end of shaft 166 maintains sleeve 168 between it and the side frame (Fig. 8). A bushing 178 is freely mounted on sleeve 168, between levers 164 and 170, upon which bushing is freely and independently mounted two sleeves 180 and 181 to which levers 163 and 162 are respectively welded. Lever 162 carries a cam roll 182 which is held against the periphery of cam 138 by a spring 183 connected between lever 162 and 174 (Fig. 6). Lever 163 carries a cam roll 184 which is held in contact with the periphery of cam 135 by a spring 185 connected between lever 163 and bar 174.

Through the mechanism above described the side guide extensions 85, table portions 92 and tuckers 118 are actuated by their respective cams in the following manner, having reference to Figs. 10 to 22. As the leading end of the severed wrapper sheet R is fed through slot 54 the table portion 92 is in retracted position (Figs. 10 and 11) so that the slot 54 is of maximum width permitting free and assured entrance of the leading edge of the wrapper sheet into the slot. The timing of the advance of the can assembly, the side guide extensions 85 and table portion 92 is such that the leading edges of extensions 85 and table portions 92 lie substantially in the plane of the leading face of the can assembly (Figs. 12 and 13) as the latter engages the wrapper and so that at the time of such engagement slot 54 has been narrowed by the amount of the previous spacing of table portion 92 from the wrapper sheet. Table portions 92 advance a slight distance further (Fig. 16) until slot 54 becomes of the minimum width giving maximum continuous support to the cans in their passage over the gap consistent with proper withdrawal of the wrapper therethrough as the can assembly carries the wrapper into the wrapping channel. It should further be noted that, as shown in Fig. 12 for example, because of the spacing of the leading row of cans the wrapper is engaged by the assembly at spaced points which would normally tend to wrinkle the wrapper and cause it to bend into the spaces between the cans in the leading row. This tendency is opposed and overcome by the transverse tautness imparted to the wrapper by the diverging suction belts 26, which are effective up to a line closely adjacent the table, and by the fact that at the bottom of the can assembly the straight edge of table portion 92 is in the plane of the leading face of the can assembly substantially as that face engages the sheet, and thus bridges the gaps between the cans of the leading row at the lower end of the cans. Thus the wrapper is folded squarely and smoothly about the leading end of the can assembly. While the table portion 92 stops its advance before the slot 54 is narrowed to a degree that would impose any substantial restriction on the withdrawal of the wrapper from slot 54, the side guide extensions 85 continue to advance with the can assembly until the leading ends of the side guide extensions are in close proximity (Fig. 17) to the adjacent ends of the tuckers 118. The leading ends of the extensions 85 approach sufficiently close to the tuckers 118 to assure sidewise control of the can assembly as the latter passes by the space between them but such space is sufficient for the front side extensions of the wrapper to be drawn inwardly between them as the tuckers fold the front side extensions of the wrapper against the side of the can assembly as shown in Figs. 16 and 17.

As the rear end of the advancing can assembly approaches the entrance to the folding channel, side guide extensions 85 start their retreat, from the wrapping channel is indicated in Figs. 18 and 19, the tuckers 118 simultaneously moving toward the entrance of the wrapping channel. These movements are so timed by the operating cams that the tucker reaches the channel entrance as the rear face of the can assembly enters the channel, Figs. 20 and 21. As, or shortly after the rear face of the can assembly passes into the wrapping channel, the tuckers reverse their movement and return to initial position at a speed not greater than the movement of the assembly. The table portions 92 and side guides 85 have retreated after the passage of the end of can assembly over slot 54 and in time to widen the slot to provide assured entrance of the on-coming wrapper sheet R (Fig. 22) for the succeeding assembly of cans.

The previously mentioned cam adjusting for accommodating can assemblies of different length will now be considered. The distance traveled by a given pusher from its point of engagement with the rear face of the can assembly to the wrapper sheet is fixed and, as previously stated, the pushers travel at a fixed speed. Thus, while the corresponding distance traveled by the rear face of the assembly is constant the distance traveled by the leading face of the assembly in reaching the wrapper sheet is less for a long assembly than for a short one and obviously a longer time elapses between the passage of the leading and rear faces of the longer assembly into the wrapping channel. The distances through which the side guide extensions 85, table portions 92 and tuckers 118 reciprocate are constant. The only changes in their cycle of movement to accommodate their operation to can assemblies of shorter or longer length is a change in the points in their cycle at which their movements start and the length of their dwells between changes in direction.

The manner in which the desired results are achieved by the previously mentioned adjustment of the cam assembly is illustrated in Fig. 9, which shows the relative position of members 139 and 140, which make up cam 138, which actuates the side guide extensions 85, as adjusted for the shortest can assembly. Cam 138 rotates in the direction of the arrow in Fig. 9. As the slope from the high at $a$ to the low at $b$ (reading counterclockwise) passes beneath cam roll 182 the extensions 85 are advanced from their rearmost position to a position in proximity to the tuckers 118 as described, and as the concentric low $b$—$c$ passes beneath the cam roll the extensions dwell in that position. As the slope $c$—$d$ passes under the cam roll the extensions return to their rearmost position and dwell in the latter position while the concentric high $d$—$a$ passes under the cam roll completing one cam cycle.

As stated, Fig. 9 shows cam 138 adjusted for the shortest length of can assembly. It will be recalled that cam member 139 (and member 136 of cam 135 and cam 141) are held in fixed relation to the driving sprocket 155 of the pusher conveyor by bolts 146 (Fig. 8) which extend through and fit circular openings in those members and cam 141. It will also be recalled that cam members 140 and 137 are held in fixed relation to each other by studs 150 and are provided with arcuate slots S through which bolts 146 pass, member 139 and cam 141 being provided with arcuate slots S' and S" through which studs 150 extend. Upon loosening nuts 149, cam members 140 and 137 (cams 141 and 135 are omitted from Fig. 9 for clarity) may be rotated relative to member 139 (and 136 and 141) in the direction of the arrow to the limit permitted by slots S, S' and S" in which bolts 146 and pins 150 respectively travel. As will be evident from Fig. 9 such movement advances point $a$ to point $a'$ at the same time that dwell $a$—$d$ is shortened to $a'$—$d$ and dwell $c$—$b$ is lengthened to $c$—$b'$. Thus initiation of the movements of the side guide extensions 85 by cam 138 is advanced in the cam cycle while initiation of the return movement by the low $d$—$c$, due to the facsimile character of members 139 and 140 maintains its position in the cycle and its duration. As will be obvious a simultaneous corresponding adjustment in the timing of the initial movement of table member 92 by cam 135 takes place. Since the desired movement of the tuckers is always in a fixed relation to the rear end of the assembly and therefore to the pushers 71, and their initial movement in the cycle coincides with the initiation of the return movement of the side guides which is fixed in the cycle at $c$, no change in the relative position of cam 141 is required and cam 141 is therefore held stationary by bolts 146 along with members 139 and 136 during the adjustment.

For convenience in effecting the described cam adjustment one of the pins 150 (Fig. 8) may be provided with a socket 189 adapted to receive a removable pin 190 to act as a crank.

It will be evident that one advantage of the cam assembly above described is the easy adjustment of the lengths of the dwells of the members, controlled by the cams, at one end of their reciprocation without change in the relative timing of the movement of the members with respect to each other and that the timing of the actuation of the members at one end of their dwell with respect to the conveyor is undisturbed. It will further be evident that by reversing the arrangement of the cam members held stationary and made movable the dwell could be lengthened at the opposite end of the reciprocation of the members controlled by the cam, if it was found desirable to provide for adjusting the position of the conveyor flights as for example to accommodate the timing of the device which supplies the cans to the conveyor.

The side members 119 extend the full length of the wrapping channel and continue the side restraint on the assembly as the latter passes beyond the tuckers 118 and throughout the balance of its travel through the channel. As best shown in Figs. 19 and 21, as the assembly passes the side tuckers 118 the lower side extensions or flaps 203 of the wrapper are engaged by the stationary folders 192 which fold them upwardly against member 119. As the lower flaps are being thus folded upwardly the upper wrapper side extensions or flaps 204 are passing over glue applying rolls 195, supplied from any suitable source of glue not shown. Rolls 195 apply a band of glue to the underside of flaps 204 and as the assembly passes beyond rolls 204 the glued upper flaps 204 are folded downwardly over the upwardly folded lower flaps 203 and into adhering relation therewith by stationary folders 120.

The glue rolls 195 are supported from elongated brackets 196, Fig. 7, adjustably mounted on plates 116 as by screws 197 and slots 198.

The folders 120, which extend to the end of the folding channel, are shown as formed integral with the top 115 of the folding channel, which top is adjustably supported from the brackets 196 by slotted brackets 200 and screws 199.

As will be apparent, members 119 lie between the cans and the overlapped flaps 204 and 203 as the assembly progresses through the channel. To press the glued upper flap 204 into firm contact with lower flap 203 and secure a strong uniform adhesive bond between them a permanent magnet 208 (Figs. 7 and 23) is clamped between plates 206 formed of brass or similar non-magnetic material and the brackets 196 by nuts 209 threaded on studs 207 extending from plates 206. The magnet attracts the members 119 and presses the overlapped side flap folds against the side folders to assure proper and permanent adhesion of the flaps to each other.

The machine may be powered from any suitable source. As diagrammatically shown in Fig. 1, power is derived from a motor 300. The shaft of the motor carries a sprocket 301 which through chain 302 drives a sprocket 303 fixed to a cross shaft 304. Shaft 304 carries a sprocket 305 about which chain 156 engages to drive the cam shaft 134 through sprocket 155. Shaft 134 also carries sprockets 306 connected by chains 307 to sprockets 308 on shafts 309 of the glue rolls 195 to drive the latter. Shaft 304 carries a second sprocket 307 which, through chain 308, drives a sprocket 309 fixed to a cross shaft 310. Shaft 310 carries a sprocket 311 connected by a chain 312 to a sprocket 313 on shaft 17 to drive the latter and the wrapper cutting and feeding mechanism as previously described. Shaft 310 carries a third sprocket 314 connected by a chain 315 to a sprocket 316 fixed to shaft 77 to drive the infeed conveyor.

As the assembly emerges from the channel and the restraint of side members 119 the cans are held in assembled relation by the wrapper, and the trailing top, bottom, and side portions of the wrapper may be folded over the rear end of the assembly and glued in place, to complete the enclosure of the assembly, by any suitable means.

While the machine of the invention has been described with reference to the bundling of empty cans it will be understood that its use is not limited thereto and that it has utility in the bundling of filled cans and other cylindrical articles or assemblies of small packages generally where similar control of the assembly during wrapping is desirable, and in the wrapping of articles having irregular or non-planar surfaces in engagement with the enclosing wrapper.

What is claimed is:

1. A machine for wrapping an assembly of articles, including a support for the article assembly, wrapping channel spaced from the support in the line of advance of the assembly and means to advance the assembly over the support and into and through the wrapping channel; means to feed a wrapper sheet between the support and channel, spaced side guides extending along the support and between which the assembly is confined as it is advanced over the support, the forward end portions of said guides and of said support being extensible, and means to advance said extensible portions of the side guides and support to position their leading edges in at least close proximity to the wrapper sheet at the time the leading end of the assembly is advanced into engagement with said sheet by the assembly advancing means.

2. A machine for wrapping an assembly of articles as recited in claim 1, said wrapper feeding means releasing the wrapper sheet at a position closely adjacent that at which the sheet is engaged by the assembly and including means to impose transverse tension to the sheet adjacent said position of release.

3. A machine for wrapping an assembly of articles, including a support for the article assembly and a wrapping channel spaced from the support in the line of advance of the assembly, and means to advance the assembly over the support and into and through the wrapping channel; means to feed a wrapper sheet between the support and channel, spaced side guides extending along the support and between which the assembly is confined as it is advanced over the support, the forward end portions of said guides and of said support being extensible, tucker members positioned within and spaced inwardly from the entrance of the wrapping channel, and means to advance said extensible portions of the side guides and support to position their leading edges in at least close proximity to the wrapper sheet at the time the leading end of the assembly is advanced into engagement with said sheet, the said means for advancing the extensible portions of the side guides thereafter advancing the latter in substantial coincidence with the leading face of the assembly as the latter moves into the wrapping channel, until the leading edge of the extensible side guide portions are in close proximity to said tucker members.

4. A machine for wrapping an assembly of articles, including a support for the article assembly, a wrapping channel spaced from the support in the line of advance of the assembly, and means to advance the assembly over the support and into and through the wrapping channel; means to feed a wrapper sheet between the support and channel, spaced side guides extending along the support and between which the assembly is confined as it is advanced over the support, the forward end portions of said guides and of said support being extensible, tucker members positioned within and spaced inwardly from the entrance of the wrapping channel, and means to advance said extensible portions of the side guides and support to position their leading edges in at least close proximity to the wrapper sheet at the time the leading end of the assembly is advanced into engagement with said sheet, the said means for advancing the extensible portions of the side guides thereafter advancing the latter in substantial coincidence with the leading face of the assembly as the latter moves into the wrapping channel until the leading edge of the extensible side guide portions are in close proximity to said tucker members, means to return the extensible portions of the support and side guides to their initial postion, means to move the tuckers coincident with the said return movement of the extensible portions of the support and side guides to maintain the latter and the tuckers in close proximity during said return and to position the tuckers substantially at the entrance of the folding channel at the time the trailing end of the assembly enters the channel, and means to thereafter return the tuckers to their initial position.

5. A machine for wrapping an assembly of articles as recited in claim 4, the means for advancing the article assembly being a constantly operating flight conveyor and the means for moving said extensible portion of the support, side guides and tuckers comprising five cam members mounted in parallel relation on a shaft driven in fixed relation to said conveyor, two of said cam members respectively driving the support extensions, and the side guide extensions in one direction, two other of said cam members respectively driving the support extensions and the side guide extensions in the opposite direction and the fifth cam member driving the tuckers in both directions, the cam members driving the support extensions and the side guide extensions in one direction and the cam member driving the tucker being secured in fixed relation to each other as a unit, the cam members driving the support extensions and the side guide extensions in the opposite direction being fixed to each other as a unit, one of said units being fixed to said shaft, the other unit being mounted on the shaft for limited angular adjustment relative to the shaft and said one unit to accommodate the operation of the cams to can assemblies of varying length, and means to releasably secure the units together in adjusted relation.

6. A machine for wrapping an assembly of articles as recited in claim 4, said wrapper feeding means including suction belts engaging the edges of the wrapper sheet outwardly of the sides of the assembly, said belts being inclined outward to apply transverse tension to the sheet at the time the sheet is engaged by the advancing assembly.

7. A machine for wrapping an assembly of articles, including a support for the article assembly, a wrapping channel spaced from the support in the line of advance of the assembly, and means to advance the assembly over the support and into and through the wrapping channel; means to feed a wrapper sheet between the support and channel, a set of side guide members extending along the support and between which the assembly is confined as it is advanced over the support, a second set of side guide members extending along the wrapping channel from a point inwardly of the channel entrance and between which the assembly is confined as it is advanced through the wrapping channel, the forward end portions, at least, of the first set of side guides, being reciprocable for movement into close proximity to the adjacent ends of the second set of side guides, to maintain formation of the assembly throughout the advance of the latter over the support, across the space between the support and channel and through the channel.

8. A machine for wrapping an assembly of articles, incluuding a support for the article assembly, a wrapping channel spaced from the support in the line of advance of the assembly, and means to advance the assembly over the support and into and through the wrapping channel; means to feed a wrapper sheet between the support and channel, a set of side guide members extending along the support and between which the assembly is confined as it is advanced over the support, a second set of side guide members extending along the wrapping channel from a point inwardly of the channel entrance and between which the assembly is confined as it is advanced through the wrapping channel, the adjacent end portions, at least, of said guide members and at least the forward end portion of the support, being respectively reciprocable to maintain formation of the assembly throughout the advance of the latter over the support, across the space between the support and channel and through the channel.

9. A machine for wrapping an assembly of articles, including a support for the article assembly, a wrapping channel spaced from the support in the line of advance of the assembly and means to advance the assembly over the support and into and through the wrapping channel; means to feed a wrapper sheet between the support and channel, a pair of guide members extending along the support and between which the assembly is confined as it is advanced over the support, a second pair of guide members extending along the wrapping channel and between which the assembly is confined as it is advanced through the wrapping channel, the adjacent end portions of said pairs of guides being separated from the body portions of the guides, the body portions being fixed and said end portions being reciprocably mounted, said reciprocable end portions and fixed body portions interdigitating to maintain continuity of the guides in all positions of reciprocation of the end portions, the reciprocable end portions of the second set of guides forming tucker members normally positioned inwardly of the entrance of the channel, and means to advance the end portions of the first set of guide members, in substantial coincidence with the leading face of the assembly as the latter moves into the wrapping channel, into close proximity to the tucker-forming end portions of the second pair of guide members.

10. A machine for wrapping an assembly of articles as recited in claim 9, the last-named means including means to return the end portions of the first pair of guide members to their initial position and means to simultaneously move the tucker-forming ends of the second pair of guide members to the entrance of the wrapping channel and to thereafter return the said tucker-forming ends to their normal position.

11. A machine for wrapping an assembly of articles as recited in claim 10, the folding channel including upper and lower folders for folding the upper and lower side extensions of the wrapper over the body portions of the second pair of side guides and in overlapping relation with each other as the assembly is advanced through the channel.

12. A machine for wrapping an assembly of articles as recited in claim 11, means to apply adhesive to one of the side extensions of the wrapper prior to the folding of said side extensions into overlapping relation, plates between which and the body portions of the second pair of guide members the overlapped side extension of the wrapper advance, and magnetic means to draw the last-mentioned members toward said plates to press the said overlapped wrapper extensions into adhering contact.

13. In a wrapping machine including a support and aligned wrapper folding instrumentalities over and through which the article to be wrapped is advanced, the wrapping instrumentalities being spaced from the support; means for feeding a wrapper through the space between the support and wrapping instrumentalities, said wrapper feeding means including suction belts extending in the direction of the wrapper feed and engaging the edge portions of the wrapper outwardly of the path of movement of the article, said belts diverging in the direction of the wrapper feed and extending into proximity to the plane of the article support.

14. A cam assembly for effecting intermittent reciprocation of a plurality of devices in fixed timed relation to each other and with a variable dwell between the initiation of their movement in one direction which comprises two sets of cam members, mounted in parallel relation on a driven shaft, the cam members of one set being secured in fixed relation to each other and respectively controlling the movement of the devices in one direction and the cam members of the other set being secured in fixed relation to each other and respectively controlling the movement of the devices in the opposite direction, one set of cam members being fixed to said shaft and the other set of cam members being mounted on the shaft for limited angular adjustment relative to the shaft and said one set, and means to releasably secure the sets together in adjusted relation.

15. A device for advancing a wrapper sheet or the like which comprises a plurality of belts extending in the direction of sheet travel and traveling in channel members of slightly greater width and slightly less depth than the belts, the under side of the belts being provided with spaced transverse ribs, the floor of the channels being provided with longitudinally spaced openings, and means to supply suction to said openings.

16. A device as in claim 15, at least two of said belts diverging from each other in the direction of belt travel.

References Cited in the file of this patent

UNITED STATES PATENTS

| | | |
|---|---|---|
| 615,441 | Emmerich | Dec. 6, 1898 |
| 1,580,178 | Talbot | Apr. 13, 1926 |
| 2,451,343 | Kunzle | Oct. 12, 1948 |
| 2,490,781 | Cloud | Dec. 13, 1949 |
| 2,609,646 | Total | Sept. 9, 1952 |
| 2,680,336 | Prince | June 8, 1954 |
| 2,755,533 | Miller | July 24, 1956 |
| 2,772,880 | Garrett | Dec. 4, 1956 |
| 2,844,929 | Ringler | July 29, 1958 |